(12) United States Patent
    Rodrigues et al.

(10) Patent No.: US 10,166,865 B2
(45) Date of Patent: Jan. 1, 2019

(54) AUTOMATIC CONTROL OF DRIVELINE STATES

(71) Applicant: FORD GLOBAL TECHNOLOGIES, LLC, Dearborn, MI (US)

(72) Inventors: Ashok E. Rodrigues, Farmington Hills, MI (US); Andreas E. Perakes, Canton, MI (US); Richard D. Bruns, Dearborn, MI (US); Derek K. Ward, Duisburg (DE); Jim Koppenol, DeLier (NL); Nicholas E. McCubbin, Northville, MI (US); Peter J. Grutter, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 651 days.

(21) Appl. No.: 14/264,389

(22) Filed: Apr. 29, 2014

(65) Prior Publication Data

US 2014/0236443 A1    Aug. 21, 2014

Related U.S. Application Data

(63) Continuation-in-part of application No. 12/906,388, filed on Oct. 18, 2010, now abandoned.

(51) Int. Cl.
    *B60K 23/08* (2006.01)
    *B60K 28/16* (2006.01)

(52) U.S. Cl.
    CPC ............ *B60K 23/08* (2013.01); *B60K 28/165* (2013.01); *B60K 23/0808* (2013.01); *B60K 2023/085* (2013.01); *B60W 2550/12* (2013.01); *B60W 2550/147* (2013.01); *B60W 2550/148* (2013.01); *B60Y 2300/28* (2013.01)

(58) Field of Classification Search
    CPC .. B60K 23/08; B60K 23/085; B60K 23/0808; B60K 28/165; B60K 2023/085; B60W 2550/12; B60W 2550/147; B60W 2550/148
    See application file for complete search history.

(56) References Cited

U.S. PATENT DOCUMENTS 4,417,641 A    11/1983  Kageyama
    4,511,014 A     4/1985  Makita
    4,613,008 A     9/1986  Hiraiwa et al.
    4,664,216 A     5/1987  Kodama et al.
    4,828,070 A     5/1989  Maramatsu
                (Continued)

FOREIGN PATENT DOCUMENTS

JP    62059136 A    3/1987
    JP    62163833 A    7/1987
                (Continued)

Primary Examiner — Jelani A Smith
Assistant Examiner — Donald J Wallace
(74) Attorney, Agent, or Firm — James Dottavio; MacMillan, Sobanski & Todd, LLC (57) ABSTRACT

A method for controlling a vehicle driveline uses sensors to estimate a need for powering secondary wheels for each of a plurality of conditions. The estimates are scaled and the scaled estimates summed. Only primary wheels are powered when the summed estimates are less than a reference value. Both the primary and secondary wheels are powered when the summed estimates exceed the reference value.

20 Claims, 4 Drawing Sheets

(56) References Cited

U.S. PATENT DOCUMENTS

| | | | |
|---|---|---|---|
| 4,840,246 A | 6/1989 | Yamakawa et al. | |
| 5,170,343 A * | 12/1992 | Matsuda | B60G 17/0185 |
| | | | 700/79 |
| 5,594,648 A | 1/1997 | Nakaura | |
| 5,740,042 A | 4/1998 | Fujioka | |
| 5,813,490 A * | 9/1998 | Takasaki | B60K 23/0808 |
| | | | 180/249 |
| 6,131,686 A | 10/2000 | Scotti et al. | |
| 6,580,994 B2 | 6/2003 | Katayama et al. | |
| 6,962,226 B2 | 11/2005 | Goto et al. | |
| 7,152,707 B2 | 12/2006 | Matsuda | |
| 7,188,017 B2 | 3/2007 | Rodrigues et al. | |
| 7,487,028 B2 | 2/2009 | Shigeta et al. | |
| 7,490,690 B2 * | 2/2009 | Ohno | B60K 17/344 |
| | | | 180/233 |
| 7,634,344 B2 | 12/2009 | Masuda et al. | |
| 7,870,925 B2 | 1/2011 | Perakes et al. | |
| 8,469,854 B1 * | 6/2013 | Downs | B60K 23/08 |
| | | | 475/221 |
| 8,930,085 B2 * | 1/2015 | Takeuchi | B60W 50/085 |
| | | | 340/441 |
| 9,346,353 B2 * | 5/2016 | Stares | B60K 17/34 |
| 2006/0195231 A1 * | 8/2006 | Diebold | B60R 21/013 |
| | | | 701/1 |
| 2009/0076696 A1 * | 3/2009 | Perkins | B60K 23/08 |
| | | | 701/69 |
| 2010/0023223 A1 * | 1/2010 | Huang | B60W 40/09 |
| | | | 701/44 |
| 2010/0084210 A1 * | 4/2010 | Martus | B60K 17/02 |
| | | | 180/245 |
| 2010/0209892 A1 * | 8/2010 | Lin | G09B 19/167 |
| | | | 434/71 |
| 2012/0293317 A1 | 11/2012 | Hanna et al. | |

FOREIGN PATENT DOCUMENTS

| | | |
|---|---|---|
| JP | 1036526 | 2/1989 |
| JP | 8332940 | 12/1996 |

* cited by examiner

AUTOMATIC CONTROL OF DRIVELINE STATES

CROSS REFERENCE TO RELATED APPLICATION

This application claims priority to, and the benefit of, U.S. application Ser. No. 12/906,388, filed Oct. 18, 2010, the full disclosure of which is incorporated herein by reference.

BACKGROUND OF INVENTION

The present invention relates to motor vehicle drivelines and in particular to transmitting power continually to a first wheel set and selectively to a second wheel set.

All-wheel drive (AWD) or four-wheel drive (4WD) systems tend to reduce vehicle fuel economy due to increased driveline parasitic losses, even when the AWD or 4WD system is not activated. Driveline disconnect systems improve fuel economy by disconnecting as many of the driveline rotating parts as possible, as close to the transmission output and the secondary drive wheels as possible, when all-wheel drive is not activated.

In virtually all front-wheel drive (FWD) vehicles and many rear-wheel drive (RWD) vehicles that produce AWD or 4WD, operation in two-wheel drive (2WD) is not automatically provided. In such vehicles, 2WD operation is produced in response to being manually selected by a vehicle operator. But requiring that 2WD operation be manually selected creates an inconvenience for operators, who may expect fully automatic operation of the driveline. Fuel economy is also decreased for operators who leave the vehicle in AWD or 4WD mode, or in vehicles that provide no selectable 2WD operation. A need exists in the industry for a control method that automatically switches between the 2WD and AWD or 4WD modes to save fuel while minimizing or eliminating any disruptions that vehicle occupants might notice.

Sensors exist that may directly read a road in front of vehicle tires for grip but the sensors have a high error rate and are prohibitively expensive to use with motor vehicles. A need exists in the industry to estimate whether conditions need the AWD or 4WD mode engaged.

There may be a time delay between activation of the AWD or 4WD mode and connection of the AWD or 4WD system. A need exists in the industry to detect a need to engage the AWD or 4WD mode in advance of conditions needing the AWD or 4WD mode engaged.

SUMMARY OF INVENTION

An embodiment contemplates a method for controlling a vehicle driveline. Sensors are used to estimate a need for powering secondary wheels for each of a plurality of conditions. The estimates are scaled and the scaled estimates are summed. Primary wheels only are powered when the summed estimates are less than a reference value. Both primary and secondary wheels are powered when the summed estimates exceed the reference value.

Another embodiment contemplates a method for controlling a vehicle driveline. Current vehicle, road, and weather conditions are used to estimate a probability as to whether powering secondary wheels is needed. Primary wheels only are powered when the probability is low and a forced connect condition is absent. Primary wheels only are powered when the probability is high and a forced disconnect condition is present. Both primary and secondary wheels are powered when the probability is high and a forced disconnect condition is absent. Both primary and secondary wheels are powered when the probability is low and a forced connect condition is present.

An advantage of an embodiment is automatically switching between the 2WD and AWD or 4WD modes to improve fuel economy while minimizing or eliminating any disruptions that vehicle occupants might notice. An advantage of an embodiment is reduced error and cost to determine the need for AWD or 4WD mode. An advantage of an embodiment is detecting the need to engage the AWD or 4WD mode in advance of conditions needing the AWD or 4WD mode engaged.

DETAILED DESCRIPTION

Figure 1:
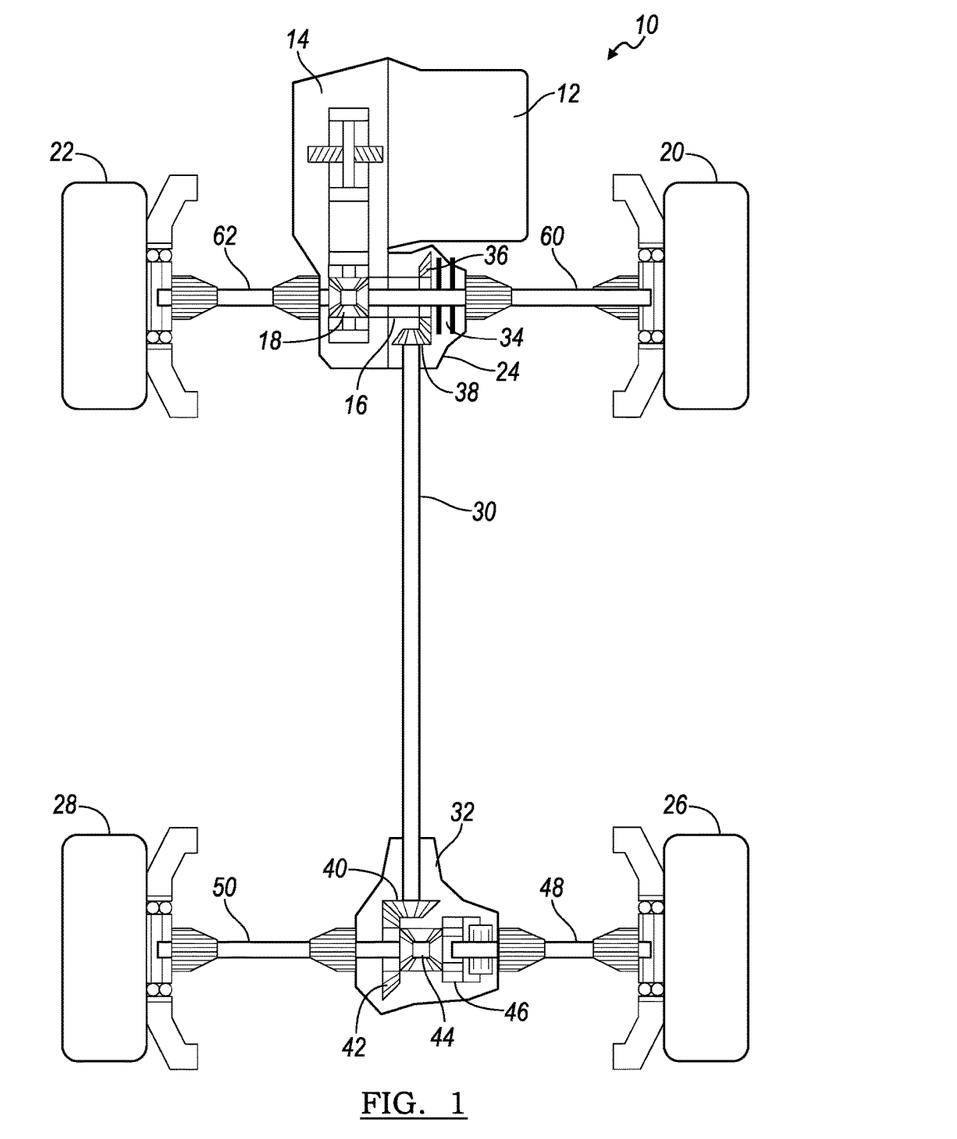
FIG. 1 is a schematic diagram of a motor vehicle driveline having primary and secondary road wheels.

FIG. 1 illustrates a driveline 10 for a vehicle. The driveline 10 is merely exemplary. As understood by one skilled in the art, the driveline 10 may be an internal combustion engine driveline or an electrified vehicle driveline, such as an electrical vehicle driveline, hybrid vehicle driveline, or plug-in hybrid vehicle driveline; be operated such that multiple sets of wheels are driven, such as an all-wheel drive (AWD) or four wheel drive (4WD) mode; and be operated such that only a single set of wheels is driven, such as a front-wheel drive (FWD) or rear-wheel drive (RWD) mode.

The driveline 10 includes a power source 12, such as an internal combustion engine or an electric motor, and a transmission 14 that produces a variable ratio between speed of transmission output 16, which is continually driveably connected through a differential mechanism 18 to primary road wheels 20, 22, and the speed of a transmission input, which is driveably connected to the power source 12.

The primary wheels 20, 22 are driven continually by the power source 12 during torque transfer conditions. The secondary wheels 26, 28 are undriven road wheels, except that they are driven by the power source 12 during torque transfer conditions when the all-wheel drive (AWD) mode or four-wheel drive (4WD) mode is operating.

A power transfer unit (PTU) 24 transmits power from the transmission output 16 selectively to the secondary road wheels 26, 28. A driveshaft 30 transmits rotating power from the PTU 24 to a rear drive unit (RDU) 32.

The PTU 24 comprises a coupler 34, such as a dog clutch or synchronizer, whose input is driveably connected to the transmission output 16; a bevel ring gear 36 connected to the output of the PTU coupler 34, and a bevel pinion gear 38 meshing with the bevel ring gear 36 and connected to the driveshaft 30. The PTU coupler 34 disconnects the rotating components of the PTU 24 and driveline components downstream of the PTU 24 from the transmission output 16.

The RDU 32 includes a bevel pinion gear 40, secured to the driveshaft 30; a bevel ring gear 42, meshing with the pinion 40, a differential mechanism 44, and a low-drag coupling 46. The secondary wheels 26, 28 are driven by halfshafts 48, 50 through the coupling 46 and differential 44.

The coupling 46 alternately connects and disconnects the halfshafts 48, 50 from the rotatable components of the RDU 32.

Figure 2:
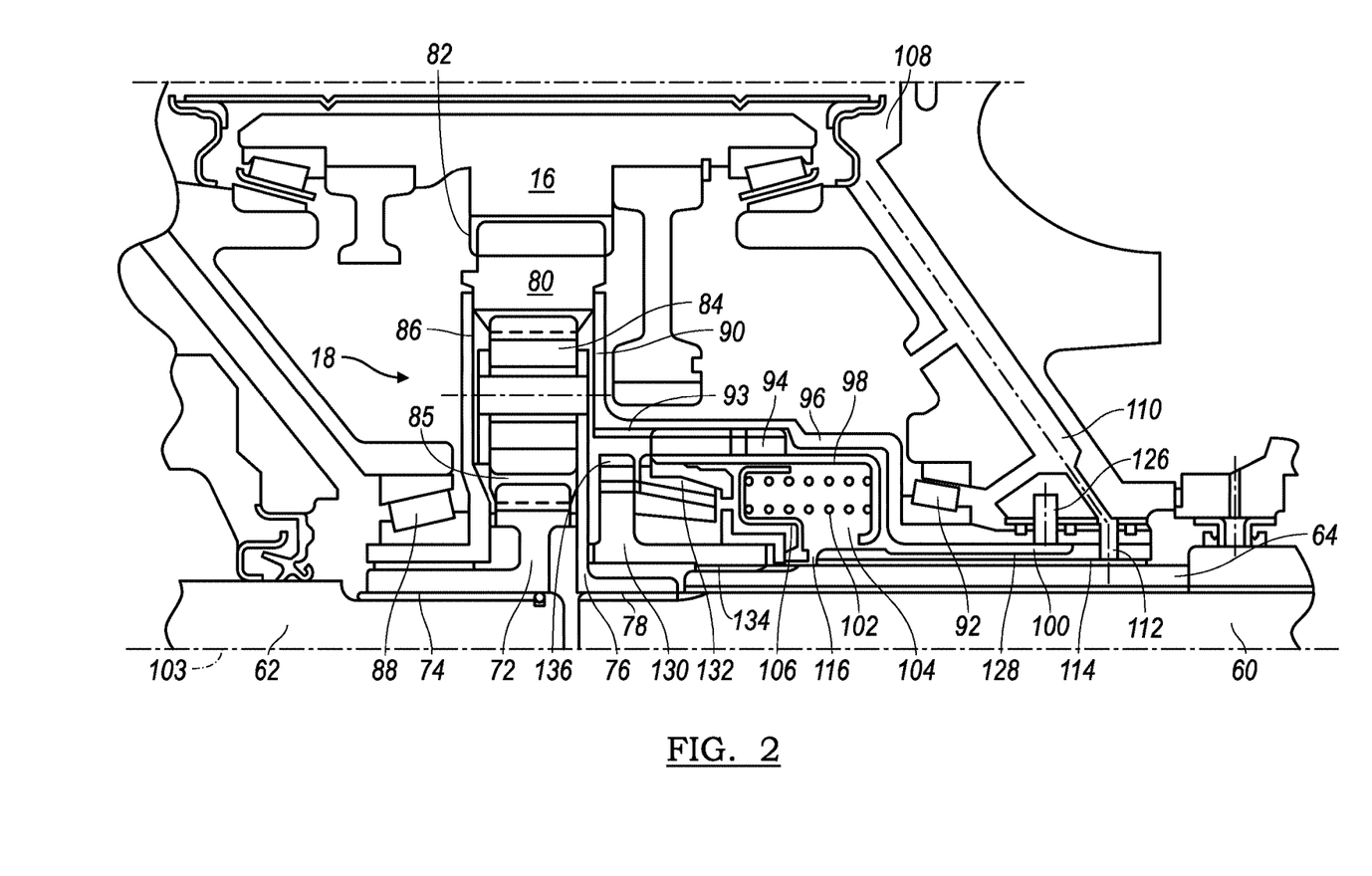
FIG. 2 is a cross section showing a drive system that connects a power source continually to a primary wheel set and selectively to a secondary wheel set.

FIG. 2 illustrates details of a power path that connects the transmission output 16 continually to the halfshafts 60, 62 for the primary wheels 20, 22 through the differential 18, and to a PTU input shaft 64, which is connected to the bevel ring gear 36.

The compound planetary differential 18 includes a sun gear 72, secured through a spline 74 to the halfshaft 62; a carrier 76, secured through a spline 78 to halfshaft 60; a ring gear 80, engaged with a pinion 82 formed on the transmission output shaft 16; first planet pinions 84 supported on the carrier 76 and meshing with the ring gear 80; and second planet pinions 85 supported on the carrier 76 and meshing with the sun gear 72 and the first planet pinions 84. One side of the ring gear 80 is secured to a disc 86 and supported at a bearing 88; the other side of the ring gear 80 is secured to a disc 90 and supported at a bearing 92. The disc 90 is formed with an internal spline 93, which engages an external spline formed on a coupler sleeve 94.

The disc 90 forms a cylinder 96, which contains a piston 98, actuated by pressurized hydraulic fluid carried to the cylinder 96 through a passage 100. A compression return spring 102 restores the piston 98 to a disengaged position shown in the FIG. 2. The piston 98 is secured to the coupler sleeve 94 such that they move along an axis 103 and rotate about the axis as a unit.

A volume 104 enclosed by the piston 98 and a spring retainer 106 forms a balance dam containing hydraulic fluid supplied from a source of hydraulic lubricant 108 through a lube circuit, which includes passages 110, 112, 114, 116.

In operation, fluid from a source of line pressure is carried to a valve, which is controlled by a variable force solenoid. The valve opens and closes a connection between the line pressure source and passages 126, 128, which carry piston-actuating pressure to a cylinder 96 depending on a state of the solenoid. When the passages 126, 128 are pressurized, the piston 98 and coupler sleeve 94 move in a first direction, causing frictional contact at a conical surface between a member 130 and a synchronizing ring 132. The member 130 is rotatably secured by a spline 134 to the PTU input shaft 64. As speed of the member 130 is synchronized with speed of the ring gear 80, the internal spline of coupler sleeve 94 engages dog teeth on the synchronizing ring 132 and clutch teeth 136 on a radial outer surface of the connecting member 130, thereby driveably connecting the ring gear 80 and PTU input shaft 64.

When the passages 126, 128 are vented, the piston 98 and sleeve 94 move in a second direction to their disengaged positions, causing the connecting member 130 to disengage the ring gear 80, thereby disconnecting the ring gear 80 from the PTU input shaft 64.

Although the description refers to the speed of the connecting member 130 being synchronized with the speed of the ring gear 80 using a synchronizer, a connection between the ring gear 80 and PTU input shaft 64 can be completed using a coupler, such as a clutch, instead of a synchronizer.

In a disconnected state, the RDU coupling 46 and PTU coupling 34 are open, causing the rotatable RDU components, driveshaft 30, and rotatable PTU components to be disconnected from the secondary wheels 26, 28 and halfshafts 48, 50.

In a connected state, the PTU coupler 34 is closed, causing the driveshaft 30 to rotate with the primary wheels 20, 22 and transmission output 16. The RDU coupling 46 has a variable torque transmitting capacity, which may produce a fully engaged connection or a defined speed difference between the driveshaft 30 and the secondary wheels 26, 28, as needed to produce AWD or 4WD mode operation.

Figure 3A:
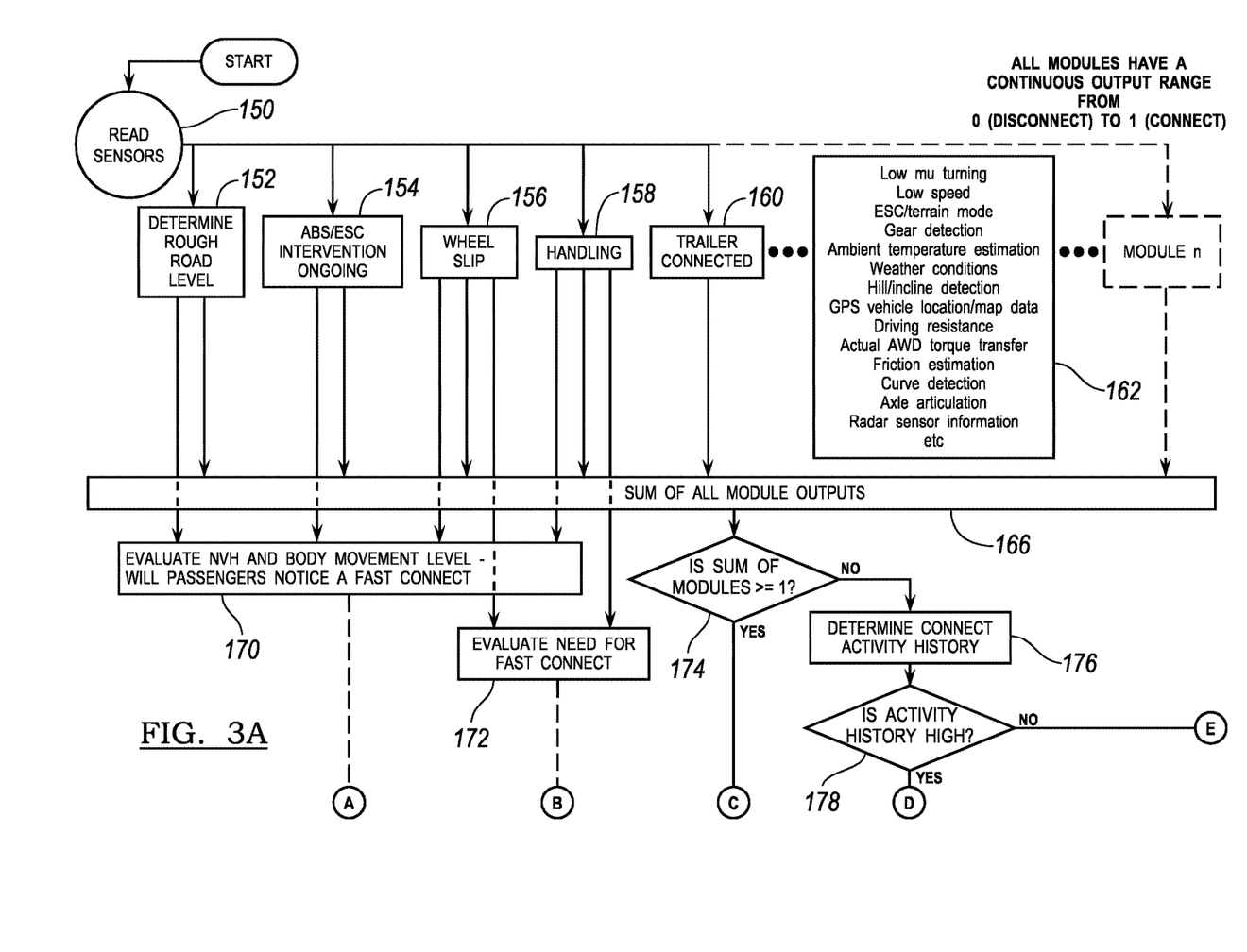
FIGS. 3A and 3B are diagrams showing information flow and method steps for engaging the driveline of FIG. 1.
Figure 3B:
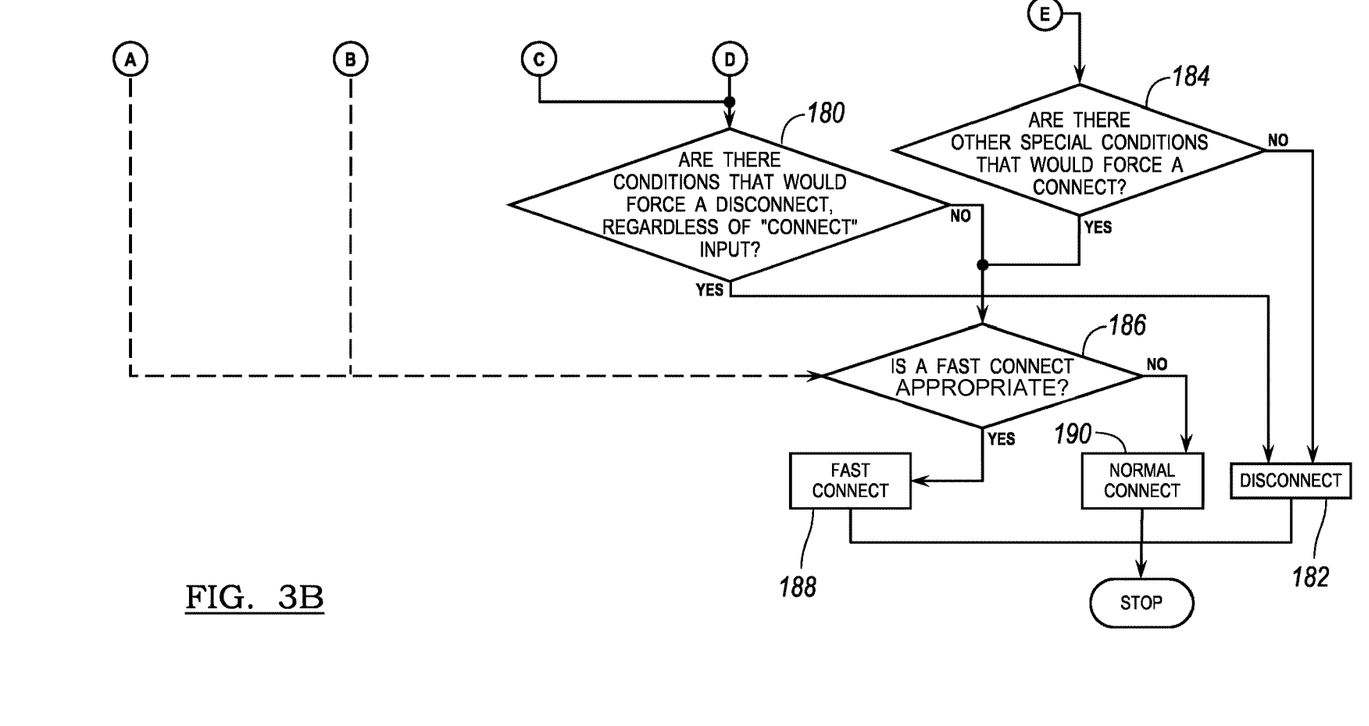

FIGS. 3A and 3B illustrate method steps of a rule-based or fuzzy logic type control system for engaging and disengaging the AWD or 4WD mode in the driveline 10 of FIG. 1. A probability of the vehicle needing the AWD or 4WD mode is estimated as a function of current vehicle, road, and weather conditions. As a non-limiting example, the probability of needing the AWD or 4WD mode may be estimated as a probability of vehicle wheel slip occurring or vehicle dynamic handling support (such as while the vehicle is turning) being needed under the current conditions. The current vehicle, road, and weather conditions may include, without limitation, vehicle operator driving patterns evidenced by driver control of the vehicle, terrain detection, terrain response mode, temperature, GPS data, weather data, coefficient of friction detection methods such as comparing amount of tire rotation for driven versus undriven wheels, difference in left-to-right tire rotation during turns versus steering wheel angle, and actual yaw versus intended yaw.

At a step 150, a controller reads various vehicle sensors monitoring the current vehicle, road, and weather conditions. The vehicle sensors are incorporated into software modules. For example, monitored modules incorporating vehicle sensors may include a (i) degree of roughness for a road the vehicle is travelling on module 152; (ii) currently active anti-lock brake system (ABS), brake traction control system (BTCS), or electronics stability control (ESC) intervention module 154; (iii) wheel slip occurrence module 156; (iv) vehicle handling is challenging module 158; or (v) the vehicle is towing a trailer module 160. Other modules 162 may include a (vi) the vehicle is turning on a road having a low coefficient of friction module; (vii) vehicle speed is low module; (viii) status of BTCS/ESC over-ride switch or a status of the AWD terrain mode selector switch module; (ix) detected gear in which the transmission 14 is operating module; (x) an estimated ambient temperature module; (xi) weather conditions (either sensed directly or inferred from an external wireless data transmission such as a weather report) module; (xii) hill or incline detected module; (xiii) GPS vehicle location data module; (xiv) driving resistance module; (xv) actual AWD torque transfer module; (xvi) an estimation of tire to road friction module; (xvii) road curve detected module; (xviii) axle articulation (either measured directly via sensors located on the vehicle or inferred from calculation of various vehicle state conditions) module; or (xix) radar sensor information module. Additional modules applicable to disengaging the AWD or 4WD mode may include ignition cycles or a cruise control status. One skilled in the art will recognize that additional modules may be used for estimating the probability of the AWD or 4WD mode being needed.

Each of the modules provides a probability output, and may also provide an integral probability output as well, each read by the controller. The probability output is a function of a current value sensed by the module. For example, a probability output of zero by a given module may indicate that there is no probability of needing to engage the AWD or 4WD mode because of the specific condition being monitored by the given module. Likewise, a probability output of one by the given module may indicate that there is sufficient probability of needing the AWD or 4WD mode due to the specific condition being monitored by the given module for the AWD or 4WD mode to be engaged. Alternatively, the given module provides a probability output between one and zero reflecting a varying probability that, due to the specific condition being monitored by the given module, the current condition will be sufficient to need the AWD or 4WD mode engaged.

The outputs provided by the modules may also include the integral probability. The integral probability output is a function of the probability of the specific condition needing the AWD or 4WD mode engaged and a duration of the probability of the specific condition needing the AWD or 4WD mode engaged. The integral probability may be calculated by integrating the probability for the given module over a time period. The integral probability output is expected to reduce to zero over the time period after the probability output returns to zero.

The outputs provided by the modules may be scaled to weight or emphasize modules more critical to the AWD or 4WD mode being needed. For example, outputs from the currently active ABS, BTCS, or ESC intervention module 154 and the wheel slip occurrence module 156 may be scaled more than outputs from the ambient temperature estimation and weather conditions modules. Greater scaling will result in outputs giving a greater probability of the AWD or 4WD mode being needed. The varying probability and scaling are a means of weighting the different module outputs.

As will be understood by one skilled in the art, the probability of the AWD or 4WD mode being needed, for a specific condition, as well as scaling of the module outputs, is a function of specific vehicles to which the control system is being applied. For example, different sizes between first and second vehicles will result in different probabilities for the same vehicle, road, or weather condition. As a result, the probability and scaling is empirical data that is calibrated, by a suitable means known to one skilled in the art, for the specific vehicles.

For example, the road roughness module 152 may calculate road roughness using a suitable algorithm (for example, a high pass filter algorithm) on speed of the primary wheels 20, 22. When a roughness level exceeds a first road roughness threshold, the road roughness module 152 provides probability between zero and one. Upon the roughness level exceeding a second roughness threshold (for example, 2 m/s), the road roughness module 152 provides probability of one. Probability provided by the road roughness module 152 between zero and one may be proportional to the roughness level between the first and second roughness thresholds. The road roughness module 152 may also provide the integral probability output.

For example, the currently active ABS, BTCS, or ESC intervention module 154 may provide probability of one when at least one of ABS, BTCS, or ESC are active. The currently active ABS, BTCS, or ESC intervention module 154 may also provide the integral probability output.

For example, the wheel slip occurrence module 156 may examine a degree of slip for the primary wheels relative to a slip threshold. When the degree of slip exceeds the slip threshold, the module 156 provides probability between zero and one. The slip threshold increases with speed. Upon the degree of slip exceeding the slip threshold by a sufficient amount (for example, 2 km/h), the module 156 provides probability of one. The module 156 may also provide the integral probability output.

For example, a longitudinal acceleration module may provide probability between zero and one when an allowable longitudinal acceleration threshold is exceeded for any of an accelerator pedal position, accelerator pedal rate change of position (for example, an 80 ms time period above a first calibratible speed), braking deceleration versus available surface friction, or driver demanded torque versus driveline actual torque (above a second calibratible speed).

For example, a yaw error module may calculate a yaw rate difference between actual and driver intended yaw. The yaw rate difference may be calculated using a bicycle model. Calculation of the yaw rate difference may be suppressed below a calibratible yaw speed threshold. When the yaw rate difference exceeds a first yaw threshold (for example, 3 degrees/sec), the longitudinal acceleration module provides probability between zero and one. Upon the yaw rate difference exceeding a second yaw threshold (for example, 6 degrees/sec), the yaw error module provides probability of one. Probability provided by the yaw error module between zero and one may be proportional to the yaw difference between the first and second yaw thresholds. The yaw error module may also provide the integral probability output.

For example, a lateral acceleration module may provide probability between zero and one when an absolute value of an actual lateral acceleration or a driver intended lateral acceleration exceeds a first lateral acceleration threshold (for example, 5 m/s$^2$). Upon the absolute value exceeding a second lateral acceleration threshold, the lateral acceleration module provides probability of one. Probability provided by the lateral acceleration module between zero and one may be proportional to the absolute value between the first and second lateral acceleration thresholds. The lateral acceleration module may also provide the integral probability output.

For example, the road friction module 162 may calculate a difference between an actual steering wheel angle and an inferred steering angle as calculated by the measurement of wheel speeds. When traction is sufficient, the actual and inferred steering wheel angles are nearly identical but as traction decreases, the actual and inferred steering wheel angles diverge. When the difference exceeds a first friction threshold (for example, 25 degrees), the friction module provides probability between zero and one. Upon the difference exceeding a second friction threshold (for example, 50 degrees), the friction module provides probability of one. Probability provided by the road friction module between zero and one may be proportional to the difference between the first and second friction thresholds. The friction module may also provide the integral probability output.

For example, the low vehicle speed module 162 may provide probability of one when vehicle speed is below a speed threshold. Hysteresis may be provided to prevent dithering if the vehicle speed hovers at the threshold speed. To prevent a detectable release bump, probability is held at one when the speed threshold is exceeded when driveline torque remains above a torque threshold.

For example, the status of BTCS/ESC over-ride switch module 162 may provide probability of one when BTCS/ESC is disabled.

For example, terrain mode is an operating mode selected in a terrain management system. Different modes can be selected by a driver for different driving situations,—e.g., normal, grass/gravel/snow, mud/ruts, or sand. The terrain mode is independent of ESC, but may change ESC modes. Different terrain modes may correspond to different probabilities between zero and one.

For example, the detected gear module 162 may provide probability of one when the transmission 14 is in a neutral gear. Debounce time, as understood by one skilled in the art, may be included to avoid providing incorrect probability when the transmission 14 is merely moving through the neutral gear. When used with a manual transmission, the debounce time is longer when moving into the neutral gear, but shorter when moving out of the neutral gear.

For example, the estimated ambient temperature module 162 may provide a lookup value based on a temperature lookup table that varies with an ambient temperature. The ambient temperature module would generally provide a probability less than one, even when the ambient temperature is below freezing. As a result, the ambient temperature module would increase the likelihood of engaging the AWD or 4WD mode, but would not force engagement in an absence of additional modules reporting non-zero probabilities.

For example, the axle articulation module 162 may monitor movement of suspension for the vehicle. When driving off-road, for example, the wheels might go from being at full droop—i.e., fully extended,—to being at full compression. All wheels are considered. For example, wheel travel sensors, fitted to all wheels with active damping, would be used to measure wheel position, and it would be tracked over time to assess the road/ground conditions. An amount of axle articulation may be proportional to a probability between zero and one.

For example, a windshield wiper module may provide probability between zero and one based on a windshield wiper lookup table that varies with wiper speed.

At a step 166, the probability outputs of the modules 152, 154, 156, 158, 160, and 162 are combined as a sum value. The sum value represents a combined likelihood of the AWD or 4WD mode needing to be engaged. When included, the integral probability outputs of the modules 152, 154, 156, 158, 160, and 162 are combined as an integral sum value. The integral sum value represents a need for the AWD or 4WD mode to remain engaged due to a combined likelihood of needing the AWD or 4WD mode to remain engaged. The sum and integral sum values are continually updated as the probability and integral probability of the modules 152, 154, 156, 158, 160, and 162 change.

At a step 170, the sensors in the modules 152, 154, 156, and 158 are used to determine whether a fast connect is possible. How quickly the AWD or 4WD is engaged is a desired rate of driveline connection. As understood by one skilled in the art, engaging the AWD or 4WD mode too quickly may result in audible clunks, tactile vibrations, or a drop in vehicle acceleration that may be felt or heard by the vehicle occupants as objectionable noise, vibration, or harshness (NVH). The step 170 evaluates, as a function of data from the sensors in the modules 152, 154, 156, and 158, whether NVH events independent of the fast connect may mask NVH resulting from the fast connect. For example, driving on a rough road may produce NVH that would mask NVH resulting from the fast connect. When NVH events independent of the fast connect may mask NVH resulting from the fast connect, then a much quicker engagement time is possible than would normally be considered acceptable. For example, the fast connect may be executed in 100 to 400 milliseconds and a normal connect executed in over 400 milliseconds. As understood by one skilled in the art, additional modules may be used to determine whether the fast connect is possible.

At a step 172, the outputs of the modules 156 and 158 are used to evaluate a need for the fast connect. For example, in the step 172, the probability alone or both the probability and integral probability may be used. For example, the need for the fast connect may result from a fast connect condition such as immediate need for AWD or 4WD mode due to wheel slip or reduced vehicle handling. As understood by one skilled in the art, additional modules may be used to evaluate the need for a fast connect.

At a step 174, a first test is performed to determine whether the sum value exceeds a threshold value. For example, when the probability values vary between one and zero, the threshold value is equal to one. The sum value may exceed the threshold value by many modules having a very low probability, some modules having a moderate probability, a few modules having a high probability, or even a single module having a probability output of one (as discussed, indicating probability of one from the single module alone is sufficient to engage the AWD or 4WD mode). The greater the probability of individual modules, the fewer modules that are needed to exceed the threshold. If the sum value exceeds the threshold value, then the control system proceeds to a step 180. If the sum value does not exceed the threshold value, then the control system proceeds to a step 176.

The steps 150, 166, and 174 will now be further discussed using four non-limiting examples.

In a first non-limiting example, the vehicle may be travelling forward in a straight line at 44 km/h in FWD mode—i.e., with the AWD or 4WD mode disengaged, without wheel slip so that each of the primary wheels 20, 22 and secondary wheels 26, 28 are rotating at 44 km/h, with zero yaw error, and an ambient temperature of 15 C. The yaw speed threshold is 15 km/h.

The yaw error module provides probability of zero. The yaw error module is enabled because vehicle speed (44 km/h) is above the yaw speed threshold (15 km/h). First, an absolute value of a difference between the actual vehicle yaw rate (detected by a yaw sensor) and the driver intended yaw rate (from the bicycle model) is calculated as an absolute yaw rate error. For this example, the absolute yaw rate error is zero. Next, an allowable yaw rate error is subtracted from the absolute yaw rate error to produce a yaw rate error adjusted. The allowable yaw rate error acts as tolerance. For this example, the allowable yaw rate error is 3, which makes the yaw rate error adjusted −3. The yaw rate error adjusted is then divided by a yaw calibration factor to produce a scaled yaw error. The yaw calibration factor is 6, which yields the scaled yaw error of −0.5. Finally, the yaw scaled error is put through a saturation block, the output of which is the yaw error probability. The saturation block limits inputted values to between zero and one. Because −0.5 falls outside the saturation block bounds, the yaw error module gives probability of zero.

The estimated ambient temperature module 162 provides probability of zero. The ambient temperature is fed through the temperature lookup table. For example, the temperature lookup table may assign the estimated ambient temperature probability as 0.2 for ambient temperatures below −25 C, 0.3 for ambient temperatures of −25 C or more and less than −10 C, 0.4 for ambient temperatures of −10 C or more and less than 3 C, and 0.0 for 3 C or more. Because 15 C is above 3 C, the estimated ambient temperature module 162 gives probability of zero.

The wheel slip occurrence module 156 provides probability of zero. First, a wheel speed adjusted is calculated as speeds of the primary and secondary wheels 20, 22 and 26, 28, respectively, adjusted for a turning radius of the vehicle to account for differences between inside and outside wheels and speed differences between primary wheel halfshafts 60, 62 and secondary wheel halfshafts 48, 50 that are inherent in geometry of the vehicle. Because the vehicle is travelling in the straight line, no adjustment is needed and the wheel speed adjusted equals the speeds of the primary and secondary wheels 20, 22 and 26, 28, respectively. Next, error due to wheel slip is calculated as an adjusted speed error. Because the primary and secondary wheels 20, 22 and 26, 28, respectively, are all rotating at 44 kh/hr, the adjusted speed error is zero. An allowable slip value is then subtracted from the adjusted speed error to produce an adjusted wheel error. The allowable slip value changes as a function of vehicle speed and accounts for small wheel speed differences due to variables such as very small differences in tires for the primary and secondary wheels 20, 22 and 26, 28, respectively. For 44 km/h, the allowable slip value is 0.2 km/h. The adjusted wheel error between the adjusted speed error and the allowable slip value is −0.2. The adjusted wheel error is then scaled by a factor of 2 to output a wheel slip scaled error of −0.1. Lastly, the wheel slip scaled error is put through the saturation block to output probability for the wheel slip occurrence module 156. Because −0.1 falls outside the saturation block bounds, the wheel slip occurrence module 156 gives probability of zero.

The sum of the yaw error module probability, estimated ambient temperature module 162, and wheel slip occurrence module 156 is zero. Because zero is less than the threshold value, for the first example, the routine 100 would proceed to the step 176.

In a second non-limiting example, the vehicle may be travelling forward in the straight line at 44 km/h in FWD mode—i.e., with the AWD or 4WD mode disengaged, with the primary wheel 20 slipping and the primary wheel 22, as well as the secondary wheels 26, 28 rotating at 44 km/h without slipping, with zero yaw error, and the ambient temperature of 15 C. The yaw speed threshold is 15 km/h.

The second example is a variation of the first example. The estimated ambient temperature module 162 provides probability of zero and the yaw error module provides probability of zero, both as in the first example.

The wheel slip occurrence module 156 provides probability of 0.5. First, the wheel speed adjusted is calculated. Because the vehicle is travelling in the straight line, no adjustment is needed and the wheel speed adjusted equals the speeds of the primary and secondary wheels 20, 22 and 26, 28, respectively. Next, error due to wheel slip is calculated as the adjusted speed error. Because the halfshaft 62 is experiencing 1.2 km/h wheel slip, the adjusted speed error is 1.2. Because the primary and secondary wheels 20, 22 and 26, 28, respectively, are rotating at 44 kh/hr, the adjusted speed error is zero. The allowable slip value is then subtracted from the adjusted speed error to produce the adjusted wheel error. For 44 km/h, the allowable slip value is 0.2 km/h. The adjusted wheel error between the adjusted speed error and the allowable slip value is then 1.0. The adjusted wheel error is then scaled by a factor of 2 to output the wheel slip scaled error of 0.5. Lastly, the wheel slip scaled error is put through the saturation block to output probability for the wheel slip occurrence module 156. Because 0.5 falls inside the saturation block bounds, the wheel slip occurrence module 156 gives probability of 0.5.

The sum of the yaw error module probability, estimated ambient temperature module 162, and wheel slip occurrence module 156 is 0.5. Because 0.5 is less than the threshold value, for the second example, the routine 100 would proceed to the step 176.

In a third non-limiting example, the vehicle may be travelling forward in the straight line at 44 km/h in FWD mode—i.e., with the AWD or 4WD mode disengaged, with the primary wheel 20 slipping and the primary wheel 22, as well as the secondary wheels 26, 28 rotating at 44 km/h without slipping, with zero yaw error, and an ambient temperature of 0 C. The yaw speed threshold is 15 km/h.

The third example is a variation of the first and second examples. The yaw error module provides probability of zero as in the first example and the wheel slip occurrence module 156 provides probability of 0.5 as in the second example.

The estimated ambient temperature module 162 provides probability of 0.4. The ambient temperature is fed through the temperature lookup table. Because 0 C is more than −10 C and less than 3 C, the estimated ambient temperature module gives probability of 0.4.

The sum of the yaw error module probability, estimated ambient temperature module 162, and wheel slip occurrence module 156 is 0.9. Because 0.9 is less than the threshold value, for the third example, the routine 100 would proceed to the step 176.

In a fourth non-limiting example, the vehicle may be travelling forward at 44 km/h in FWD mode—i.e., with the AWD or 4WD mode disengaged, with the primary wheel 20 slipping and the primary wheel 22, as well as the secondary wheels 26, 28 rotating at 44 km/h without slipping, with a slight yaw event, and the ambient temperature of 0 C. The yaw speed threshold is 15 km/h.

The fourth example is a variation of the second and third examples. The estimated ambient temperature module 162 provides probability of 0.4 as in the third example and the wheel slip occurrence module 156 provides probability of 0.5 as in the second example.

The yaw error module provides probability of 0.5. The yaw error module is enabled because vehicle speed (44 km/h) is above the yaw speed threshold (15 km/h). First, the absolute value of the difference between the actual vehicle yaw rate and the driver intended yaw rate is calculated as the absolute yaw rate error. For this example, the driver intended yaw rate is zero but the actual vehicle yaw rate is 6, which makes the absolute yaw rate error 6. Next, the allowable yaw rate error is subtracted from the absolute yaw rate error to produce the yaw rate error adjusted. For this example, the allowable yaw rate error is 3, which makes the yaw rate error adjusted 3. The yaw rate error adjusted is then divided by the yaw calibration factor to produce the scaled yaw error. The yaw calibration factor is 6, which yields the scaled yaw error of 0.5. Finally, the yaw scaled error is put through the saturation block, the output of which is the yaw error probability. Because 0.5 falls within the saturation block bounds, the yaw error module gives probability of 0.5.

The sum of the yaw error module probability, estimated ambient temperature module 162, and wheel slip occurrence module 156 is 1.4. Because 1.4 exceeds the threshold value, in the fourth example, the routine 100 would proceed to the step 180.

At the step 176 the controller determines a history of engaging and disengaging the AWD or 4WD mode. At a step 178, a second test is made to determine whether the history of engaging and disengaging AWD or 4WD mode exceeds a historical reference rate. For example, the historical reference rate may be three engagements per 1.6 km or three engagements per minute. If the history exceeds the historical reference rate, then results of the first test are overridden and the control system proceeds to a step 180. If the history does not exceed the historical reference rate, then the control system proceeds to a step 184.

At the step 180, the controller determines whether a forced disconnect condition is present that would require disengaging AWD or 4WD mode regardless of other current vehicle, road, and weather conditions—i.e., require that the driveline 10 operate in 2WD mode. The forced disconnect condition may include an ESC event in progress, reported failure mode, or current gear produced by the transmission 14 (for example, a neutral gear). If there is the forced disconnect condition, the control system proceeds to a step 182. If the forced disconnect condition is not present, the control system proceeds to a step 186.

At the step 184, the controller determines whether a forced connect condition is present that would require engaging AWD or 4WD mode regardless of the other current vehicle, road, and weather conditions—i.e., require that the driveline 10 operate in AWD or 4WD mode. The forced connect condition may include a driver disabled ESC system, driver selected special terrain response mode, very low vehicle speed, or second reported failure mode. If there is the forced connect condition, the control system proceeds to the step 186. If the forced disconnect condition is not present, the control system proceeds to the step 182.

At the step 182, the controller disconnects the transmission output 16 from the RDU 32, thereby disengaging the AWD or 4WD mode and producing 2WD operation by powering the primary wheels 20, 22. The step 182 may also require that the integral sum value be zero.

At the step 186, a third test is performed to implement the desired rate of drive connection. If the need for the fast connect is sufficiently high to outweigh NVH considerations (including NVH events independent of the fast connect itself), then the fast connect is appropriate and the control system proceeds to a step 188 in which the fast connect is executed by connecting the transmission output 16 through PTU input shaft 64 and bevel ring gear 36 to the RDU 32, thereby engaging the AWD or 4WD mode to power both the primary wheels 20, 22 and the secondary wheels 26, 28. If the fast connect is not appropriate, then the control system proceeds to a step 190 in which the normal connect is executed between the transmission output 16 and the RDU 32, thereby engaging the AWD or 4WD mode to power both the primary wheels 20, 22 and the secondary wheels 26, 28.

Alternatively, connection speed for engaging AWD or 4WD mode may be continuously variable as a function of the current vehicle, road, and weather conditions as represented by the outputs of the modules 152, 154, 156, 158, 160, and 162. For example, during the normal connect, the AWD or 4WD mode may be engaged with acceptable NVH more quickly at lower speeds than if the vehicle is traveling at higher speeds. For example, the normal connect may occur more quickly at higher operating temperatures than at lower operating temperatures.

Once engaged, the AWD or 4WD mode may remain engaged until the integral sum value has been reduced to zero.

Using the control system, the controller monitors the outputs of the modules 152, 154, 156, 158, 160, and 162 to preemptively engage the AWD or 4WD mode in accordance with the sum value. If preemptive engagement fails, then the control system may be used to maintain acceptable vehicle performance—e.g., maintaining a 15 km/h speed difference between primary wheel halfshafts 60, 62 and secondary wheel halfshafts 48, 50—for engagement of the AWD or 4WD mode. Acceptable vehicle performance may be maintained when preemptive engagement fails by using a brake traction control system. For example, the AWD or 4WD mode may be engaged after preemptive engagement fails due to wheel slip occurring and probability of the wheel slip module 156 being greater than one.

Powertrain controls may be used to increase torque during each engagement of the AWD or 4WD mode to compensate for a loss of power due to inertia and spin resistance of the secondary drive path.

When the control system is applied to a FWD driveline, a low loss clutch with limited capacity may be placed in front of the PTU 24 to synchronize the PTU 24, rear driveshaft 30, and front end of the AWD or 4WD clutch under many conditions while assistance will be required from the AWD or 4WD clutch under more severe conditions such as operating at a high vehicle speed or low temperature. Alternatively, if vehicle packaging permits, a high capacity clutch may be placed in front of the PTU 24 to synchronize the secondary driveline under all conditions while a simple dog clutch is utilized to lock and unlock the secondary driveline from the rear wheels.

While certain embodiments of the present invention have been described in detail, those familiar with the art to which this invention relates will recognize various alternative designs and embodiments for practicing the invention as defined by the following claims.

The invention claimed is:

1. A method for controlling a vehicle driveline comprising:
   determining demands to power secondary wheels for each of a plurality of vehicle related conditions detected by sensors;
   scaling the demands for each condition;
   summing the scaled demands;
   powering only primary wheels when the summed demands are less than a reference value;
   powering the primary and secondary wheels when the summed demands equal or exceed the reference value.

2. The method of claim 1 further comprising:
   powering only the primary wheels by maintaining a drive connection between a transmission output and the primary wheels and producing a drive disconnection between the transmission output and the secondary wheels;
   powering the primary and secondary wheels by maintaining the drive connection between the transmission output and the primary wheels and producing a drive connection between the transmission output and the secondary wheels.

3. The method of claim 1 further comprising:
   determining a need for powering the secondary wheels as a function of wheel slip.

4. The method of claim 1 further comprising:
   determining a need for powering the secondary wheels as a function of vehicle dynamic handling support.

5. The method of claim 1 further comprising:
   setting an integral value for one of the conditions as zero;
   using the demand for the condition to adjust the zero integral value as a function of time;
   maintaining power to the secondary wheels until the integral value returns to zero.

6. The method of claim 1 further comprising:
   varying a rate of driveline connection for powering the secondary wheels as a function of the scaled demands and whether a fast connect condition is present.

7. The method of claim 1 further comprising:
   powering the primary and secondary wheels when the summed demands are less than the reference value and an engagement history value exceeds a historical reference rate.

8. The method of claim 1 further comprising:
powering only the primary wheels as a function of a forced disconnect condition.

9. The method of claim 1 further comprising:
powering the primary and secondary wheels as a function of a forced connect condition.

10. The method of claim 1 further comprising:
determining a need for powering the secondary wheels as a function of a vehicle, road, or weather condition.

11. The method of claim 1 further comprising:
weighting the demands as a function of priority of each of the demands being relatively more or less critical for needing to power the secondary wheels.

12. A method for controlling a vehicle driveline comprising:
using current vehicle operating, road, and weather conditions to determine a probability as to whether powering secondary wheels is needed;
automatically powering only primary wheels when the probability is below a predetermined probability and a forced connect condition is absent;
automatically powering only the primary wheels when the probability is above the predetermined probability and a forced disconnect condition based on the current vehicle operating conditions is present;
automatically engaging the driveline to power the primary and secondary wheels when the probability is above the predetermined probability and a forced disconnect condition based on the current vehicle operating conditions is absent;
automatically engaging the driveline to power the primary and secondary wheels when the probability is below the predetermined probability and a forced connect condition is present.

13. The method of claim 12 further comprising:
powering only the primary wheels by maintaining a drive connection between a transmission output and the primary wheels, producing a drive disconnection between the transmission output and a driveshaft, and producing a drive disconnection between the driveshaft and axle shafts of the secondary wheels;
powering the primary and secondary wheels by maintaining the drive connection between the transmission output and the primary wheels, producing a drive connection between the transmission output and the drive shaft, and producing a drive connection between the drive shaft and the axle shafts of the secondary wheels.

14. The method of claim 12 further comprising:
needing to power the secondary wheels as a function of wheel slip.

15. The method of claim 12 further comprising:
needing to power the secondary wheels as a function of vehicle dynamic handling support.

16. The method of claim 12 further comprising:
setting an integral value for one of the conditions as zero;
using the probability to adjust the zero integral value as a function of time;
maintaining powering the secondary wheels until the integral value returns to zero.

17. The method of claim 12 further comprising:
varying a rate of driveline connection for powering the secondary wheels as a function of the current vehicle operating, road, and weather conditions and whether a fast connect condition is present.

18. The method of claim 12 further comprising:
powering the primary and secondary wheels when the probability is below the predetermined probability, a forced disconnect condition is absent, and an engagement history value exceeds a historical reference rate.

19. The method of claim 12 further comprising:
determining the probability as a function of a plurality of vehicle operating, road, or weather conditions.

20. The method of claim 19 further comprising:
weighting the vehicle operating, road and weather conditions as a function of each of the vehicle operating, road and weather conditions being relatively of more or less critical for needing to power the secondary wheels.

* * * * *